United States Patent Office 2,805,926
Patented Sept. 10, 1957

2,805,926
PLANT GROWTH REGULANTS

Dwight L. Schoene, Woodbridge, and John W. Zukel, Hamden, Conn., assignors to United States Rubber Company, New York, N. Y., a corporation of New Jersey No Drawing. Application April 11, 1956,
Serial No. 577,462

12 Claims. (Cl. 71—2.5)

This invention relates to new chemicals which are particularly useful in agricultural chemical compositions for regulating plant growth, e. g. inhibiting the sprouting of potatoes and the sucker development of tobacco, and slowing down grass growth to reduce frequency of mowing.

The new chemicals of the present invention are the hydroxymethyl and aminomethyl derivatives of maleic hydrazide and their salts. The new chemicals have other uses, for example, as intermediates for further chemical reactions, and as modifying agents for plastics of the aldehyde-phenol, aldehyde-amine, and aldehyde-amide types.

The hydroxymethyl derivative of maleic hydrazide, which may be termed methylol maleic hydrazide, may be prepared by reacting aqueous formaldehyde with maleic hydrazide, to give a compound having one or more of the isomeric structures indicated as A, B, C and D below:

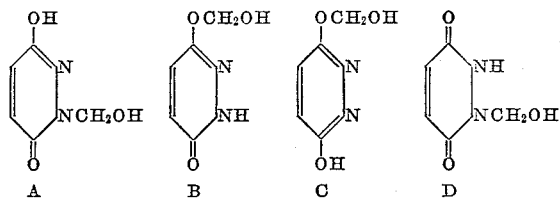

Compounds A and B are derived from the keto-enol form of maleic hydrazide; compound C is derived from the di-enol form of maleic hydrazide; and compound D is derived from the di-keto form of maleic hydrazide (see U. S. Patent 2,614,916). It is believed that the hydroxymethyl derivative of maleic hydrazide has primarily structure A, but structures B, C and/or D may also be present. For illustrative purposes, it will be considered that the hydroxymethyl and amino methyl derivatives of maleic hydrazide of the present invention have structure A.

Example I illustrates the preparation of the hydroxymethyl derivative of maleic hydrazide (methylol maleic hydrazide) from formaldehyde and maleic hydrazide as illustrated by the following reaction:

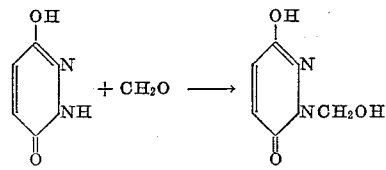

Example I also illustrates preparation of the salts of methylol maleic hydrazide.

Example I

A slurry of maleic hydrazide (56 g., 0.5 mole) in 100 ml. of water was treated with 41 grams of formalin (37% formaldehyde, 0.5 mole). Stirred well, after a few hours the mixture had set to a solid cake. The very slightly soluble methylol maleic hydrazide was collected, washed well with three portions of water, and dried at 25° C. and 1 mm. pressure. Yield 66 grams, 93% of the theoretical amount. Neutral equivalent 140, theory for $C_5H_6O_3N_2$, 142.

The alkali-metal and tertiary amine (tri-substituted ammonium) and quaternary ammonium salts of the methylol maleic hydrazide may be formed by mixing the methylol maleic hydrazide with an alkali-metal hydroxide or carbonate, or with a tertiary amine, or with a quaternary ammonium hydroxide in aqueous medium at room temperature. These water-soluble salts of methylol maleic hydrazide will react with water soluble polyvalent metal inorganic salts (e. g. calcium, barium, magnesium, copper, iron or zinc salts) to form the water-insoluble polyvalent metal salts of methylol maleic hydrazide.

The triethanolamine salt of methylol maleic hydrazide was prepared by mixing 0.005 mole of triethanolamine (0.73 gm.) with 0.005 mole of methylol maleic hydrazide (0.71 gm.) in 25 ml. of water giving a solution of the triethanolamine salt of methylol maleic hydrazide.

The diethanolamine and trimethylamine and sodium and potassium salts of methylol maleic hydrazide are made in a similar manner by mixing in an aqueous medium equimolar proportions of methylol maleic hydrazide with diethanolamine and trimethylamine and sodium hydroxide and potassium hydroxide, respectively.

The trimethyl beta-hydroxyethyl ammonium salt of methylol maleic hydrazide was made by mixing 0.005 mole of choline (0.70 gm.) and 0.005 mole of methylol maleic hydrazide (0.71 gm.) in 5 ml. of water to give a solution of the trimethyl beta-hydroxyethyl ammonium salt of methylol maleic hydrazide.

The alkali-metal and tertiary amine and quaternary ammonium salts of the hydroxymethyl derivative of maleic hydrazide may also be formed by reacting the alkali-metal or tertiary amine or quaternary ammonium salt of maleic hydrazide with formaldehyde as illustrated in the following reaction:

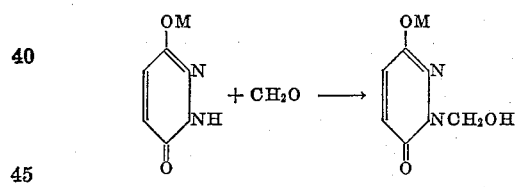

where M is alkali-metal or tri-substituted ammonium or quaternary ammonium radical.

Example II illustrates the preparation of the sodium salt of the hydroxymethyl derivative of maleic hydrazide; and recovery of the free hydroxymethyl derivative of maleic hydrazide from the salt by acidification.

Example II

A slurry of maleic hydrazide (11.2 g., 0.10 mole) in 500 ml. of water containing sodium hydroxide (4.0 g., 0.10 mole) was treated with formaldehyde (7.5 ml. of 38% solution, approximately 0.10 mole). The sodium salt of maleic hydrazide reacted with the formaldehyde to form the sodium salt of the hydroxymethyl derivative of maleic hydroxide which dissolved to form a clear solution. Similarly, mixtures of tertiary amines or quaternary ammonium compounds (e. g. trimethylamine, triethanolamine or choline) and maleic hydrazide will readily react with formaldehyde to form the trimethylamine or triethanolamine or trimethyl beta-hydroxyethyl ammonium salt of methylol maleic hydrazide.

The clear solution of the sodium salt of the hydroxymethyl derivative of maleic hydrazide prepared as above was acidified and a white product gradually crystallized. This product, the free hydroxymethyl derivative of maleic hydrazide, was washed well with water then dried at 25° C. and 1 mm. pressure, giving 10 grams of odorless crystals which did not melt but decomposed gradually when heated, liberating formaldehyde. Neutral equivalent 143, theory for $C_5H_6O_3N_2$, 142. The hydroxymethyl derivative dissolved in dilute sodium bicarbonate with evolution of carbon dioxide to again form the sodium salt.

The sodium salt of the hydroxymethyl derivative of maleic hydrazide is soluble to the extent of over 3.5 pounds per gallon of water at room temperature, whereas the sodium salt of maleic hydrazide is soluble in water only to the extent of about one pound per gallon. This is of very great advantage in making up liquid formulations for agricultural chemical purposes, as where a liquid formulation is desired for ease of precise measuring in the field. Such higher concentrations are also important where the material is applied by air, which is the preferred way of using agricultural chemicals on certain crops, such as potatoes, since a greater payload of active ingredient can be carried by plane with the greater solubility of the sodium salt of the hydroxymethyl derivative of maleic hydrazide over the sodium salt of the maleic hydrazide itself.

The aminomethyl derivatives of maleic hydrazide may be prepared by reacting the hydroxymethyl derivative of maleic hydrazide (or the alkali-metal or tertiary amine or quaternary ammonium salts thereof) with ammonia or a primary or secondary amine, as illustrated by the following reaction:

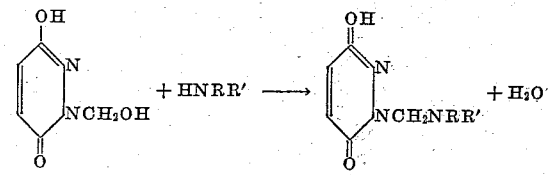

where R and R' are the same or different radicals selected from hydrogen, aliphatic radicals, and aromatic radicals, or where R and R' together form a heterocyclic radical. Similarly, the alkali-metal and tertiary amine and quaternary ammonium salts of the aminomethyl derivatives of maleic hydrazide may be prepared by reacting the alkali-metal or tertiary amine or quaternary ammonium salts of the hydroxymethyl derivative of maleic hydrazide with ammonia or a primary or secondary amine. Also, the metal salts and the alkali (ammonia or amine) salts may readily be prepared by reacting the free aminomethyl derivative of maleic hydrazide with an inorganic base or ammonia or amine.

Example III illustrates the preparation of the anilinomethyl derivative of maleic hydrazide by reacting aniline with the hydroxymethyl derivative of maleic hydrazide according to the reaction:

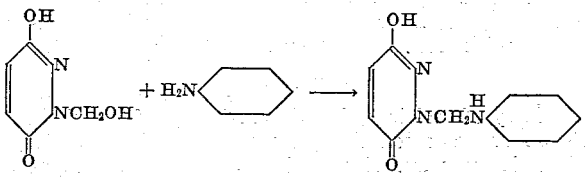

*Example III*

A slurry of maleic hydrazide, 8.8 g. in 50 ml. of water and 10 ml. alcohol was treated with 8.6 g. of 37% formaldehyde solution, giving a clear solution of the methylol maleic hydrazide. Aniline (9.3 g.) was added with 15 ml. water and 10 ml. alcohol. The anilinomethyl salt of the methylol maleic hydrazide separated, and was collected. It was crystallized from phenyl Cellosolve, giving a product melting at 200–205° with decomposition. Analysis: Dumas nitrogen: Theory 19.3%, Found 19.7%.

Where formaldehyde reacts with the ammonium or primary or secondary amine salts of maleic hydrazide, or the equivalent mixtures of maleic hydrazide with ammonia or the primary or secondary amine, the aminomethyl derivatives of maleic hydrazide are principally formed directly by condensation, instead of the ammonium, primary amine or secondary amine salts of the hydroxymethyl maleic hydrazide being formed. Excess ammonia or primary or secondary amine will form the ammonium or primary or secondary amine salt of the aminomethyl derivative of maleic hydrazide.

Example IV illustrates the direct preparation of the dodecylaminomethyl derivative of maleic hydrazide by reacting formaldehyde with the dodecylamine salt of maleic hydrazide (formed by mixing dodecylamine with maleic hydrazide) according to the following reaction:

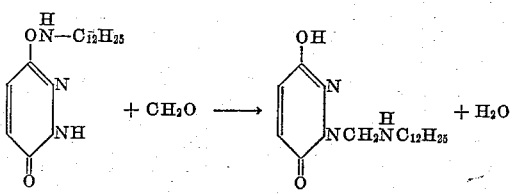

*Example IV*

Maleic hydrazide (26.4 g.) dodecylamine (55.5 g.) and water (200 ml.) were agitated while formalin (26 g. of a 37% formaldehyde solution) was added gradually. Warmed and stirred for 30 minutes, then cooled and diluted with saturated sodium chloride solution. The dodecylaminomethyl derivative of maleic hydrazide separated as a white solid, which was crystallized from alcohol—M. P. 111–15°. Analysis: Theoretical, 66.0% C, 10.1% H: Found, 66.0% C, 10.0% H.

Various salts of the dodecylaminomethyl derivative of maleic hydrazide were prepared as follows: 0.0033 mole of each of sodium hydroxide (0.13 gm.), monoethanolamine (0.20 gm.), diethanolamine (0.35 gm.), triethanolamine (0.49 gm.) and choline (0.46) were separately mixed with 0.0033 mole of dodecylaminomethyl maleic hydrazide (1.03 gms.) in 5 ml. of water to give the respective salts of the dodecylaminomethyl derivative of maleic hydrazide. On slight warming, clear solutions resulted.

Example V illustrates the preparation of other aminomethyl derivatives of maleic hydrazide and their salts similarly to the preparation of the dodecylaminomethyl derivative of maleic hydrazide in Example IV.

*Example V*

A slurry of maleic hydrazide (11.2 g., 0.10 mole) in 50 ml. of water containing diethanolamine (10.5 g., 0.10 mole) was mixed with formaline (8 g. of 38% formaldehyde solution, 0.10 mole). The solution became clear. The solution was evaporated on a steam plate, giving a viscous liquid which was vacuum dried to remove water. Yield, 23 g. (100%).

In a manner similar to the above preparation of the diethanolaminomethyl derivative of maleic hydrazide, the dimethylaminomethyl derivative of maleic hydrazide was prepared by mixing formaldehyde with an aqueous mixture of dimethylamine and maleic hydrazide (reactants in equimolar proportions).

Salts of the dimethylaminomethyl derivative of maleic hydrazide were made as follows: 0.005 mole each of diethanolamine (0.53 gm.) and of choline (0.71 gm.) were separately mixed with 0.005 mole of the dimethylaminomethyl derivative of maleic hydrazide in 5 ml. of water, giving directly solutions of the dimethylaminomethyl salt and trimethyl beta-hydroxyethyl ammonuim salt, respectively, of the dimethylaminomethyl derivative of maleic hydrazide.

The hydroxymethyl derivate of maleic hydrazide and the aminomethyl derivative of maleic hydrazide may be in the free form or in the form of their salts within the present invention and the various forms are useful in preparing agricultural chemical compositions. The following are illustrative of aminomethyl derivatives of maleic hydrazide according to the present invention other than those illustrated in the above examples which may be in the free state, or in the form of the metal salts, ammonium salts, amine salts or quaternary ammonium salts:

Aminomethyl derivative of maleic hydrazide
Methylaminomethyl derivative of maleic hydrazide
Propylaminomethyl derivative of maleic hydrazide
Butylaminomethyl derivative of maleic hydrazide
Ethanolaminomethyl derivative of maleic hydrazide
Diethylaminomethyl derivative of maleic hydrazide
Ethyl ethanolaminomethyl derivative of maleic hydrazide
Piperidinomethyl derivative of maleic hydrazide
Morpholinomethyl derivative of maleic hydrazide
Cyclohexylaminomethyl derivative of maleic hydrazide
Benzylaminomethyl derivative of maleic hydrazide
m-Toluidinomethyl derivative of maleic hydrazide
o-Chloroanilinomethyl derivative of maleic hydrazide
N,N-dimethylethylenediaminomethyl derivative of maleic hydrazide
N,N-diethyl p-phenylenediaminomethyl derivative of maleic hydrazide
Carbomethoxymethylaminomethyl derivative of maleic hydrazide (from the methyl ester of glycine)
p-Carbobutoxyanilinomethyl derivative of maleic hydrazide (from p-amino butyl benzoate)
p-Acetylanilinomethyl derivative of maleic hydrazide (from p-amino acetophenone)

The following illustrates the inhibition of plant growth by the dodecylaminomethyl and diethanolaminomethyl derivatives of maleic hydrazide of Examples IV and V respectively.

*Example VI*

Bonny Best tomato plants four inches high were sprayed to runoff with aqueous suspensions of the dodecylaminomethyl and diethanolaminomethyl derivatives of maleic hydrazide containing 0.2% of maleic hydrazide equivalent, which suspensions contained 20 parts per million (p. p. m.) of sodium lauryl sulfate, a surface-active wetting agent nontoxic to the plants. One-half the plants were held at 55–65% relative humidity at 75° F. for 48 hours and the other half were held at 100% relative humidity at 75° F. for 48 hours. Untreated check or control plants were similarly held at 55–60% and 100% relative humidity at 75° F. for 48 hours. All the plants were thoroughly washed with water spray at the end of the 48 hour period and held in the greenhouse for 22 days for observation. The degree of growth inhibition is expressed as percent of the untreated check plants. After the 55–65% relative humidity treatment for 48 hours and standing 22 days, the growth inhibition was 25%, and after the 100% relative humidity treatment for 48 hours and standing 22 days, the growth inhibition was 100% for the two chemicals tested.

*Example VII*

Bonny Best tomato plants three inches high were sprayed for ten seconds with an aqueous solution containing 2500 p. p. m. of methylol maleic hydrazide and 20 p. p. m. of sodium lauryl sulfate. Other plants were similarly sprayed with an amount of an aqueous solution of the diethanolamine salt of methylol maleic hydrazide equivalent to 2500 p. p. m. of methylol maleic hydrazide containing 20 p. p. m. of sodium lauryl sulfate. The sprayed plants were placed in a high humidity chamber at 75° F. for approximately 48 hours. The plants were thoroughly washed with water spray at the end of the 48 hour period. After standing 22 days, growth was still completely inhibited.

*Example VIII*

Bonny Best tomato plants four inches high were sprayed for ten seconds with an amount of an aqueous solution of the sodium salt of methylol maleic hydrazide equivalent to 2500 p. p. m. of methylol maleic hydrazide and 20 p. p. m. of sodium lauryl sulfate. The sprayed plants were placed in a high humidity chamber at 25° C. for approximately 48 hours. The plants were then thoroughly washed with water spray. The plants were observed after 38 days and growth was still completely inhibited.

*Example IX*

Bonny Best tomato plants four inches high were sprayed for five minutes with an amount of an aqueous solution of the potassium salt of methylol maleic hydrazide equivalent to 2500 p. p. m. of methylol maleic hydrazide containing 20 p. p. m. of sodium lauryl sulfate. The sprayed plants were placed in a high humidity chamber for 17 hours after which they were removed to the greenhouse for 31 hours. The plants were then thoroughly washed with water spray. After standing 45 days, growth was still completely inhibited.

The agricultural chemical compositions prepared from the chemicals of the present invention are preferably aqueous compositions which contain a surface-active wetting agent such as those disclosed in U. S. Patent 2,614,916. The chemicals of the present invention may, however, be used in an inert medium as a dust in admixture with a powdered solid carrier. They may be admixed with a surface-active wetting agent and a powdered solid carrier for addition of water to the desired concentration of active chemical.

Having thus described our invention, what we claim and desire to protect by Letters Patent is:

1. A chemical selected from the group consisting of hydroxymethyl and aminomethyl derivatives of maleic hydrazide and their salts.
2. Methylol maleic hydrazide.
3. Sodium salt of methylol maleic hydrazide.
4. Trimethylamine salt of methylol maleic hydrazide.
5. Triethanolamine salt of methylol maleic hydrazide.
6. Trimethyl beta-hydroxyethylammonium salt of methylol maleic hydrazide.
7. An agricultural chemical composition comprising material selected from the group consisting of hydroxy methyl and aminomethyl derivatives of maleic hydrazide and their salts, said composition containing a surface-active wetting agent.
8. An agricultural chemical composition comprising methylol maleic hydrazide and a surface-active wetting agent.
9. An agricultural chemical composition comprising the sodium salt of methylol maleic hydrazide and a surface-active wetting agent.
10. An agricultural chemical composition comprising the trimethylamine salt of methylol maleic hydrazide and a surface-active wetting agent.
11. An agricultural chemical composition comprising the triethanolamine salt of methylol maleic hydrazide and a surface-active wetting agent.
12. An agricultural chemical composition comprising the trimethyl beta-hydroxyethyl ammonium salt of methylol maleic hydrazide and a surface-active wetting agent.

References Cited in the file of this patent

UNITED STATES PATENTS

| | | |
|---|---|---|
| 2,614,916 | Hoffman et al. | Oct. 21, 1952 |
| 2,614,917 | Zukel et al. | Oct. 21, 1952 |